(12) United States Patent
Bozak et al.

(10) Patent No.: US 7,551,622 B2
(45) Date of Patent: Jun. 23, 2009

(54) QUALITY OF SERVICE ENFORCEMENT

(75) Inventors: Erol Bozak, Pforzheim (DE); Alexander Gebhart, Bad Schoenborn (DE)

(73) Assignee: SAP AG, Walldorf (DE)

( * ) Notice: Subject to any disclaimer, the term of this patent is extended or adjusted under 35 U.S.C. 154(b) by 616 days.

(21) Appl. No.: 11/010,802

(22) Filed: Dec. 13, 2004

(65) Prior Publication Data

US 2006/0126639 A1    Jun. 15, 2006

(51) Int. Cl.
*H04L 12/28* (2006.01)
*H04L 12/56* (2006.01)
*H04J 3/16* (2006.01)
*H04J 3/22* (2006.01)

(52) U.S. Cl. .................. 370/395.21; 370/468
(58) Field of Classification Search .............. 370/395.2, 370/395.21, 465, 468
See application file for complete search history.

(56) References Cited

U.S. PATENT DOCUMENTS

| 6,505,232 | B1 * | 1/2003 | Mighdoll et al. ............ 709/203 |
| 6,711,607 | B1 * | 3/2004 | Goyal ......................... 709/203 |
| 6,977,899 | B1 * | 12/2005 | Matragi et al. .............. 370/237 |
| 2002/0065922 | A1 * | 5/2002 | Shastri ....................... 709/227 |
| 2004/0205165 | A1 * | 10/2004 | Melamed et al. ............ 709/219 |
| 2006/0168224 | A1 * | 7/2006 | Midgley ..................... 709/226 |

* cited by examiner

*Primary Examiner*—Ronald Abelson
(74) *Attorney, Agent, or Firm*—Finnegan, Henderson, Farabow, Garrett & Dunner, LLP

(57) ABSTRACT

A method in a network of interconnected computer systems includes generating a Quality of Service (QoS) requirements document between a client and a first server for execution of a service in the first server, initiating execution of the service in the first server in response to a client request, and migrating execution of the service from the first server to a service in a second server if the first server cannot guarantee requirements specified in the QoS requirements document.

21 Claims, 4 Drawing Sheets

QUALITY OF SERVICE ENFORCEMENT

TECHNICAL FIELD

The present invention relates to data processing by digital computer, and more particularly to quality of service (QoS) enforcement.

BACKGROUND

Grid computing is a form of distributed system wherein computing resources are shared across networks. Grid computing enables the selection, aggregation, and sharing of information resources resident in multiple administrative domains and across geographic areas. These information resources are shared, for example, based upon their availability, capability, and cost, as well as a user's quality of service (QoS) requirements. Grid computing can mean reduced cost of ownership, aggregated and improved efficiency of computing, data, and storage resources, and enablement of the creation of virtual organizations for applications and data sharing.

SUMMARY

The present invention provides methods and apparatus, including computer program products, for application recovery in a grid network.

Embodiments consistent with the invention include a method generating a Quality of Service (QoS) requirements document between a client and a first server for execution of a service in the first server. The method may initiate execution of the service in the first server in response to a client request. The method may also migrate execution of the service from the first server to a service in a second server if the first server cannot guarantee requirements specified in the QoS requirements document.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
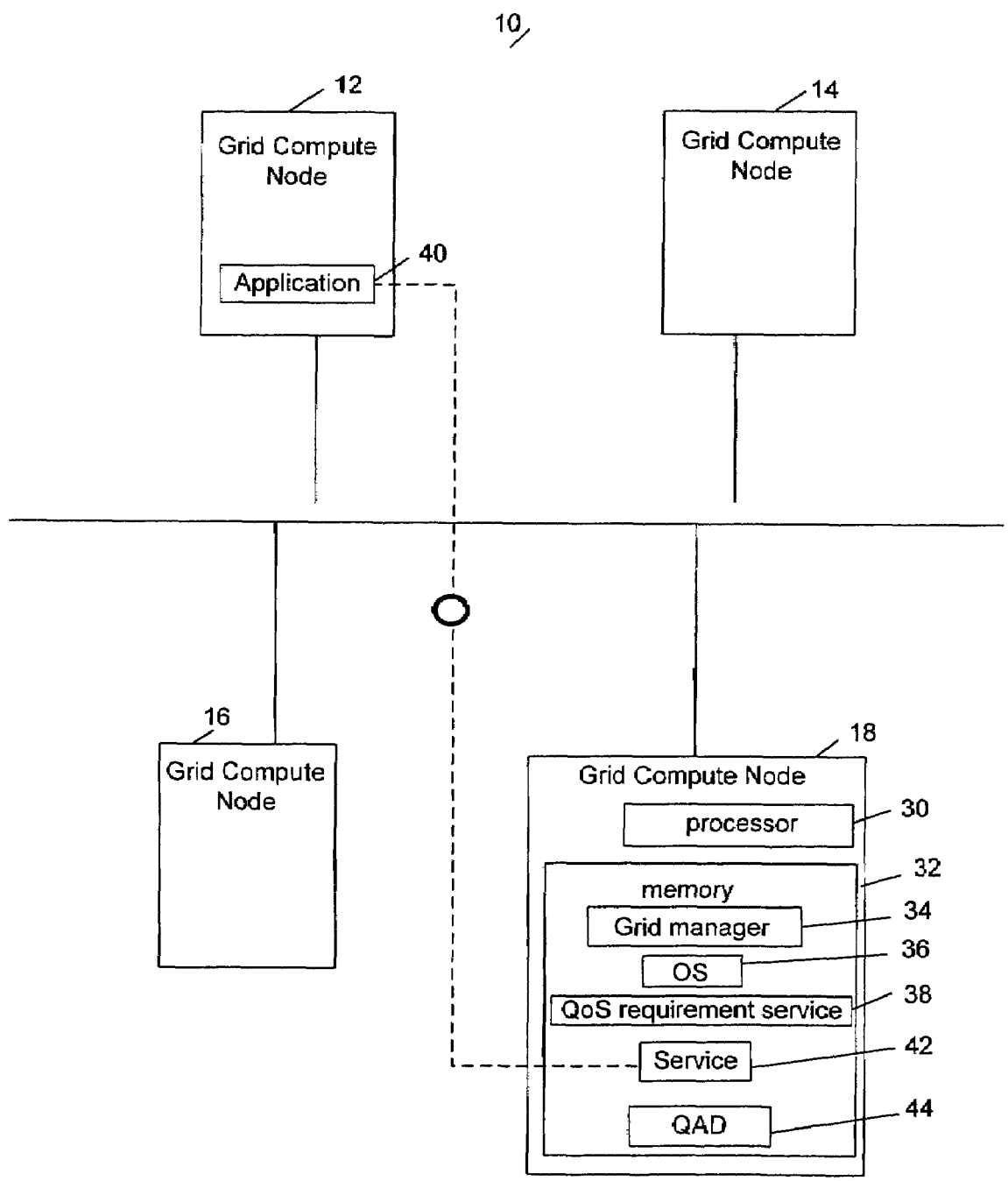
FIG. 1 is block diagram.

As shown in FIG. 1, a grid network 10 in accordance with one embodiment of the invention includes a number of interconnected grid compute nodes 12, 14, 16, 18. In an example, the grid network 10 is implemented as a client-server network. Client/server describes a relationship between two computer programs in which one program, the client, makes a service request from another program, the server, which fulfills the request. Although the client/server idea can be used by programs within a single computer, it is a more important idea in a network, such at network 10. In a network, the client/server model provides a convenient way to interconnect programs that are distributed efficiently across different locations.

In the client/server model, one server, sometimes called a daemon, is activated and awaits client requests. Typically, multiple client programs share the services of a common server program. Both client programs and server programs are often part of a larger program or application. Relative to the Internet, a Web browser is a client program that requests services from a Web server in another computer somewhere on the Internet.

Each of the grid compute nodes, grid compute node 18 for example, can include a processor 30 and a memory 32. Memory 32 includes a grid manager 34, an operating system (OS) 36, such as Unix, Linux or Windows, and Quality of Service (QoS) enforcement service 38. In a particular example, the QoS enforcement service 38 is implemented as a container. In Sun Microsystems' JavaBeans component architecture and in Microsoft's Component Object Model (COM), a container is an application program or subsystem in which the program building block known as a component is run.

Each of the grid compute nodes 12, 14, 16, 18 include applications capable of executing in response to a request to perform a task. These grid-enabled applications rely on services provided by one or more of the grid compute nodes 12, 14, 16, 18. A client system (e.g., grid compute node 12) in which a grid-enabled application 40 resides can negotiate a required QoS level with a server (e.g., a service host system such as grid compute node 18) system that provides a service 42. When the application 40 calls on the service 42 residing in the service host system 18, during a lifetime of the service 42, the QoS enforcement service 38 monitors service quality and compares a measured QoS level with a quality of service defined in a QoS agreement document (QAD) 44 that describes various aspects of quality that the client system 12 requires, such as, a required level of performance measured in central processing unit (CPU) cycles or reliability. In an example, the QAD 44 is stored in a local database.

If the QoS enforcement service 38 detects discrepancies between the measured quality and the requested quality (i.e., as defined in the QAD 44), the QoS enforcement service 38 tries to compensate by requesting more resources from the service host system 18. If the quality level cannot be guaranteed by the service host system 18 the QoS enforcement service 38 initiates a service migration process 100 to a grid compute node that is capable of providing the desired quality, as specified in the QAD 44.

Figure 2:
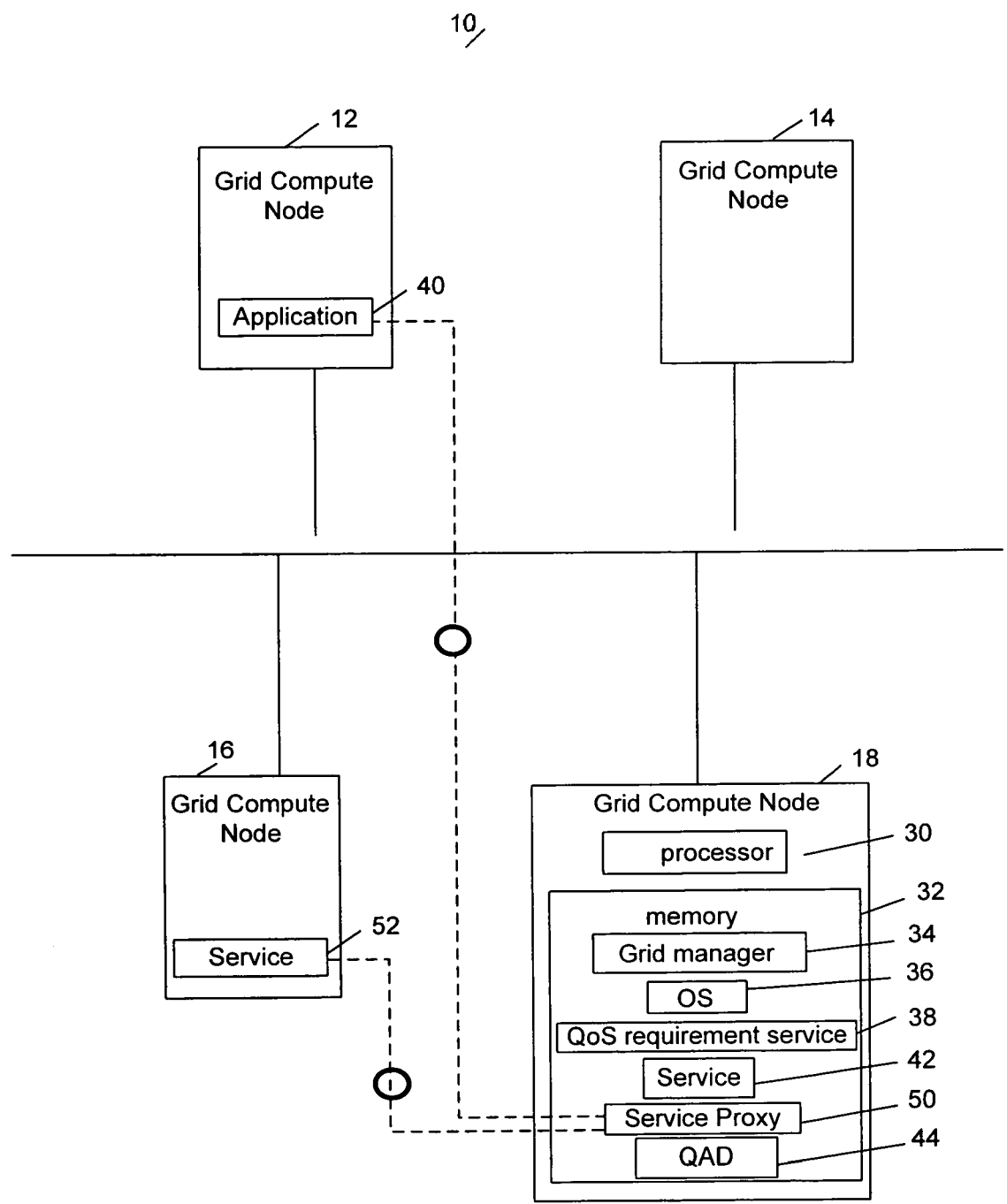
FIG. 2 is a block diagram.

As shown in FIG. 2, the service migration process 100 results in placement of a service proxy 50 in host system 18. The service proxy 50 routes messages between the client system 12 and a service 52 residing in another service host system, such as grid compute node 16. Since the service proxy 50 is used at the service host 18 to route all messages between the client system 12, (i.e., application 40) and the service 52 in the service host 16, the client system 12 is not affected by the migration. In a particular example, during the service migration process 100 all messages between the client system 12 and the service 52 in the service host 16 are queued in the service host 18 until the service migration process 100 ends. The queued messages are then forwarded to the service 52 in service host 16 for processing.

In one particular example, the QoS enforcement service 38 monitors service quality in the service host 16 and compares a measured QoS level with the quality of service defined in the QAD 44 that describes various aspects of quality that the client system 12 requires. If the QoS enforcement service 38 detects discrepancies between the measured quality and the required or requested quality specified in the QAD, the QoS enforcement service 38 tries to compensate by requesting more resources from the service host system 16. If the quality level cannot be guaranteed by the service host system 16 the QoS enforcement service 38 initiates the service migration process 100 to a grid compute node that is capable of providing the desired quality of service, such as grid compute node 14.

In a more general example, each host includes a QoS enforcement service. If the QoS enforcement service migrates to a second host 16, the original QoS enforcement service is no longer responsible for quality and the QoS enforcement service in host 16 takes on the responsibility. If the QoS enforcement service migrates from host 16 to host 14, it now becomes responsible. If such a migration occurs, the QoS enforcement service informs the service proxy 50 to point to a service 54 residing in another service host system to avoid chains of proxies.

Figure 3:
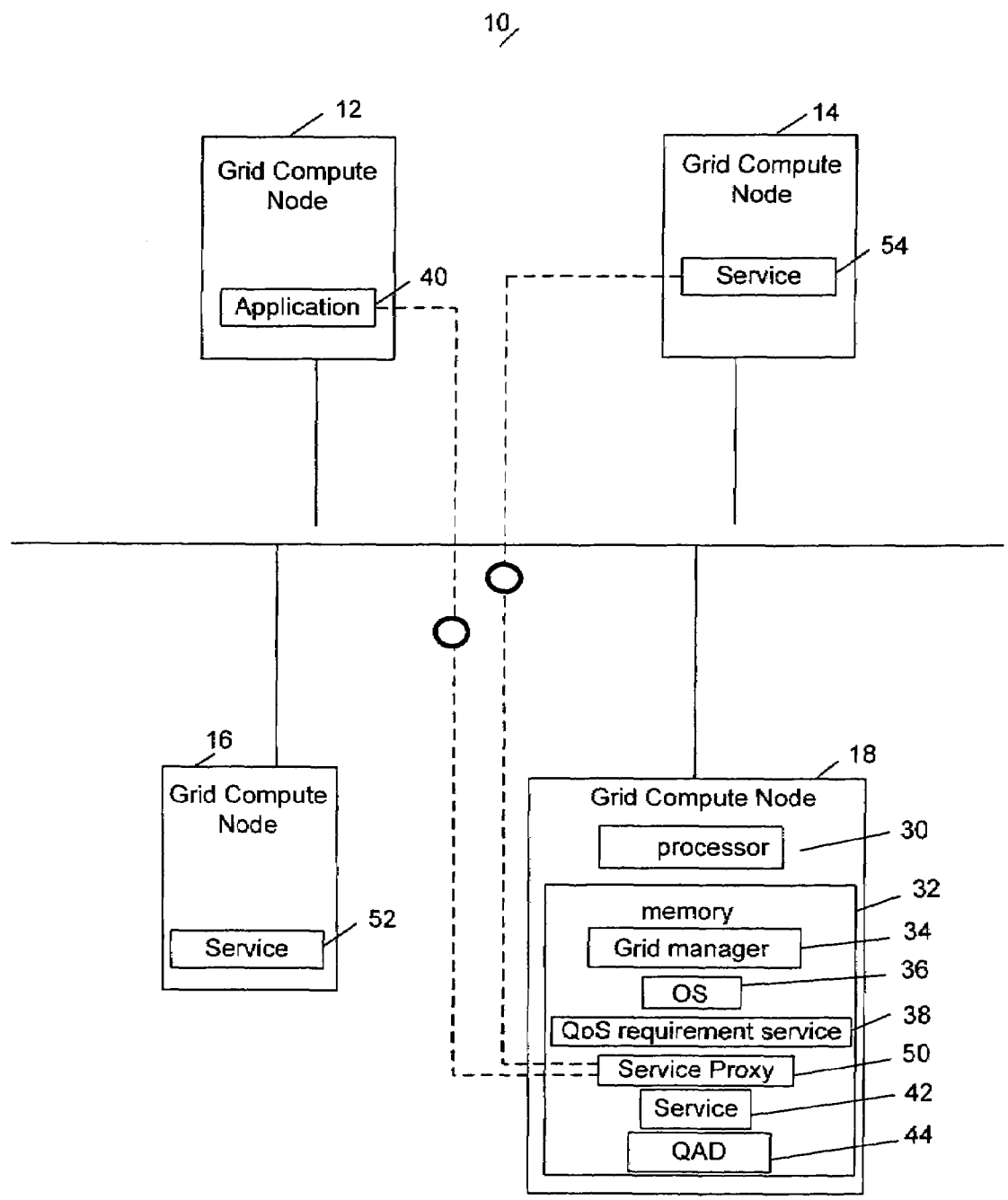
FIG. 3 is a block diagram.

As shown in FIG. 3, the service migration process 100 results in reconFIGuration of the service proxy 50 in host system 18. The reconFIGured service proxy 50 routes messages between the client system 12 (i.e., application 40) to the service 54 residing in another service host system, such as grid compute node 14. Since the service proxy 50 is used at the service host 18 to route all messages between the client system 12 and the service 54 in the service host 14, the client system 12 is not affected by the migration. In a particular example, during the service migration process 100 all messages between the client system 12 and the service 54 in the service host 14 are queued in the service host 18 until the service migration process 100 ends. The queued messages are then forwarded to the service 54 for processing.

The QoS enforcement service 38 monitors service quality in the service host 14 and compares a measured QoS level with the quality of service specified in the QAD 44 that describes various aspects of quality that the client system 12 requires. If the QoS enforcement service 38 detects discrepancies between the measured quality and the requested quality specified in the QAD 44 the QoS enforcement service 38 tries to compensate by requesting more resources from the service host system 14. If the quality level cannot be guaranteed by the service host system 14 the QoS enforcement service 38 initiates the service migration process 100, as described above. To avoid chains of service proxies, the service host 14 notifies service host 16 that it has initiated migration and points to an address of the migrated service 54, since each host includes its own QoS enforcement service.

Figure 4:
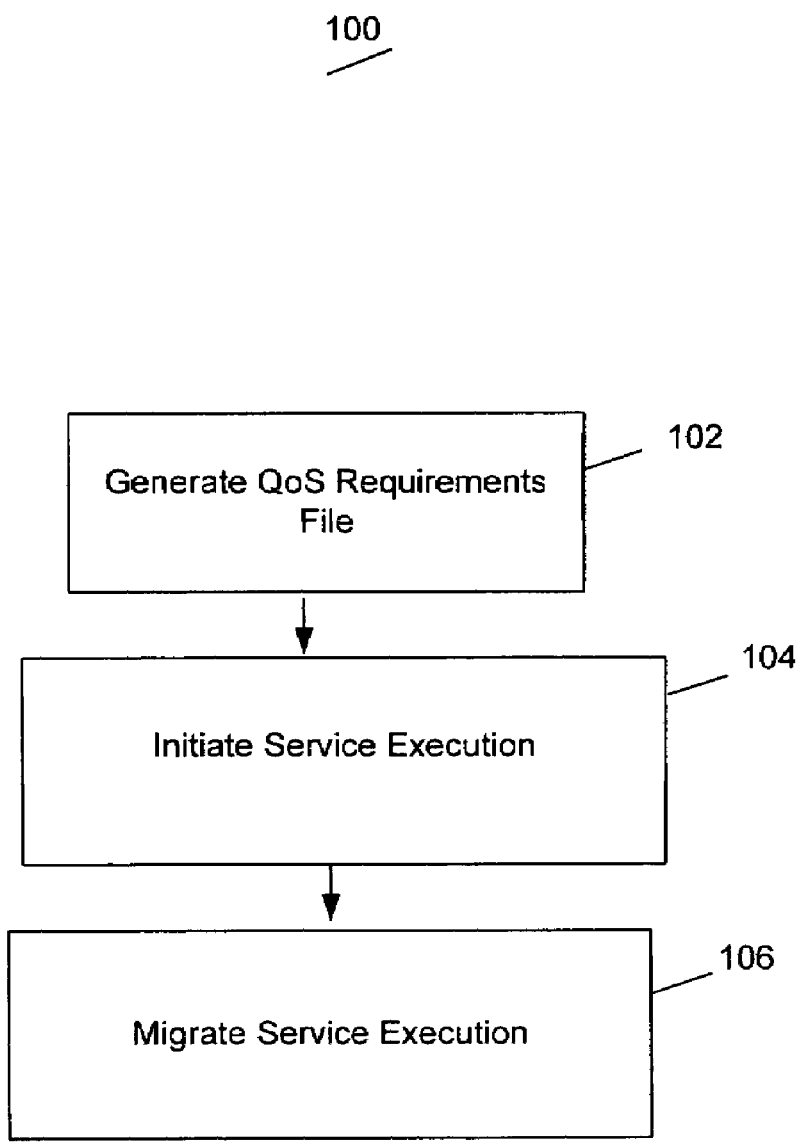
FIG. 4 is a flow diagram.
Like reference symbols in the various drawings indicate like elements.

As shown in FIG. 4, the service migration process 100 includes, in a network of interconnected computer systems, generating (102) a Quality of Service (QoS) requirements document between a client and a first server for execution of a service in the first server. The QoS requirements document can include, for example, a specified level of server performance measured in central processing unit (CPU) cycles and/or a specified server availability.

Process 100 initiates (104) execution of the service in the first server in response to a client request.

Process 100 migrates (106) execution of the service from the first server to a service in a second server if the first server cannot guarantee requirements specified in the QoS requirements document.

Migrating (106) includes instantiating the service in the second server and establishing a service proxy in the first server for communication between the client and the second service in the second server. Migrating (106) can also include monitoring the second server to guarantee requirements specified in the QoS requirements document, and, in response to determining, reconFIGuring the service proxy in the first server to route messages between the client and a service executing in a third server if quality requirements are not met in the second server.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

What is claimed is:

1. A method for use in a network of interconnected computer systems, comprising:

generating a Quality of Service (QoS) requirements document between a client and a first server having a resource for execution of a service in the first server;

initiating execution of the service in the first server in response to a client request;

calculating, using the first server, an actual QoS level based on execution of the client-requested service in the first server;

implementing a QoS requirement service in the first server to monitor execution of the client-requested service, the QoS requirement service comparing the actual QoS level with a requirement specified in the QoS requirements document and requesting the first server to search for an additional resource within the first server when the first server cannot guarantee the requirement specified in the QoS requirements document;

migrating execution of the client-requested service from the first server to a service in a second server if the first server cannot locate the additional resource or cannot guarantee the requirement specified in the QoS requirements document by using the additional resource, the migration being performed by creating a first connection between the first server and the second server and sending the client request from the first server to the second server over the first connection via a message;

executing the client-requested service in the second server by using the service in the second server, while maintaining the first connection; and monitoring execution of the client-requested service in the second server by using the QoS requirement service of the first server, wherein the QoS requirement service migrates execution of the client-requested service from the second server to a third server when the second server cannot guarantee the requirement specified in the QoS reqirements document, the migration being performed by breaking the first connection and creating a second connection between the first server and the third server to send the client request to the third server over the second connection.

2. The method of claim 1 wherein the QoS requirements document comprises a specified level of server performance measured in central processing unit (CPU) cycles.

3. The method of claim 1 wherein the QoS requirements document comprises a specified server availability.

4. The method of claim 1 wherein migrating to the second server comprises:

instantiating the service in the second server; and establishing a service proxy in the first server for communication over the first connection.

5. The method of claim 4 wherein migrating to the third server further comprises reconfiguring the service proxy in the first server to route messages between the client and a service executing in the third server.

6. A method for use in a network of interconnected computer systems, comprising:

implementing a QoS requirement service in a first server to monitor service quality in the first server, by using the first server to compare an actual QoS level of a client-requested service with a requirement specified in a QoS requirements document maintained in the first server, the first server having a resource;

requesting, using the QoS requirement service, the first server to search for an additional resource within the first server when the first server cannot guarantee the requirement specified in the QoS requirements document;

migrating an execution of the client-requested service in the first server to a service in a second server when the first server cannot locate the additional resource or cannot satisfy the requirement contained in the QoS requirements document by using the additional resource, the migration being performed by creating a first connection between the first server and the second server and sending the client request from the first server to the second server over the first connection via a message;

executing the client-requested service in the second server by using the service in the second server, while maintaining the first connection; and monitoring execution of the client-requested service in the second server by using the QoS requirement service of the first server, wherein the QoS requirement service migrates execution of the client-requested service from the second server to a third server when the second server cannot guarantee the requirement specified in the QoS requirements document, the migration being performed by breaking the first connection and creating a second connection between the first server and the third server to send the client request to the third server over the second connection.

7. The method of claim 6 wherein the QoS requirements document comprises a minimum level of server performance measured in central processing unit (CPU) cycles.

8. The method of claim 6 wherein the QoS requirements document comprises server reliability information.

9. The method of claim 6 wherein migrating to the second server further comprises:

establishing a service proxy in the first server for communication between the client system and the second server during the execution of the service in the second server; and instantiating the service in the second service.

10. The method of claim 9 wherein migrating to the third server comprises reconfiguring the service proxy in the first server to route messages between the client system and a service executing in the third server.

11. A computer program product, tangibly embodied in a computer-readable storage medium, the storage medium comprising instructions which when executed on a data processing apparatus in a network of interconnected computer systems, cause the data processing apparatus to:

generate a Quality of Service (QoS) requirements document between a client and a first server for execution of a service in the first server, the first server having a resource;

initiate execution of the service in the first server in response to a client request;

calculate, using the first server, an actual QoS level based on the execution of the client-requested service;

implement a QoS requirement service in the first server to monitor execution of the client-requested service, the QoS requirement service comparing the actual QoS level with a requirement specified in the QoS requirements document and requesting the first server to search for an additional resource within the first server when the first server cannot guarantee the requirement specified in the QoS requirements document;

migrate execution of the service from the first server to a service in a second server if the first server cannot locate the additional resource or cannot guarantee the requirement specified in the QoS requirements document by using the additional resource, the migration being performed by creating a first connection between the first server and the second server and sending the client request from the first server to the second server over the first connection;

execute the client-requested service in the second server by using the service in the second server, while maintaining the first connection; and monitor execution of the client-requested service in the second server by using the QoS requirement service of the first server, wherein the QoS requirement service migrates execution of the client-requested service from the second server to a third server when the second server cannot guarantee the requirement specified in the QoS requirements document, the migration being performed by breaking the first connection and creating a second connection between the first server and the third server to send the client request to the third server over the second connection.

12. The product of claim 11 wherein the QoS requirements document comprises a specified level of server performance measured in central processing unit (CPU) cycles.

13. The product of claim 11 wherein the QoS requirements document comprises a specified server availability.

14. The product of claim 11 wherein migrating to the first server comprises:
   instantiating the service in the second server; and
   establishing a service proxy in the first server for communication between the client and the second server during execution of the service in the second server.

15. The product of claim 14 wherein migrating to the third server further comprises reconfiguring the service proxy in the first server to route messages between the client and a service executing in the third server.

16. A system comprising:
   a client for requesting execution of a service;
   a first server having a resource for execution of the service in the first server;
   a second server receiving the client request when the first server cannot guarantee execution of the service; and
   a third server receiving the client request when the second server cannot guarantee execution of the service, the first server:
      generating a Quality of Service (QoS) document;
      initiating execution of the service in response to the client request;
      calculating an actual QoS level based on the execution of the client-requested service;
      implementing a QoS requirement service to monitor execution of the client-requested service, the QoS requirement service comparing the actual QoS level with a requirement specified in the QoS requirements document and requesting search for an additional resource within the first server when the first server cannot guarantee the requirement specified in the QoS requirements document;
      migrating execution of the service from the first server to a service in the second server if the first server cannot locate the additional resource or cannot guarantee the requirement specified in the QoS requirements document by using the additional resource, the migration being performed by creating a first connection between the first server and the second server and sending the client request from the first server to the second server over the first connection;
      maintaining the first connection as the client-requested service is being executed in the second server; and
      monitoring execution of the client-requested service in the second server by using the QoS requirement service,
   wherein the QoS requirement service migrates execution of the client-requested service from the second server to a third server when the second server cannot guarantee the requirement specified in the QoS requirements document, the migration being performed by breaking the first connection and creating a second connection between the first server and the third server to send the client request to the third server over the second connection.

17. The system of claim 16 wherein the QoS requirements document comprises a specified level of server performance measured in central processing unit (CPU) cycles.

18. The system of claim 16 wherein the QoS requirements document comprises a specified server availability.

19. The system of claim 16 wherein migrating to the second server comprises:
   instantiating the service in the second server; and
   establishing a service proxy in the first server for communication between the client and the second service in the second server.

20. The method system of claim 19 wherein means for migrating to the third server further comprises reconfiguring the service proxy in the first server to route messages between the client and a service executing in the third server.

21. A method for use in a network of interconnected computer systems, comprising:
   generating a Quality of Service (QoS) requirements document between a client and a first server having a resource for execution of a service in the first server;
   initiating execution of the service in the first server in response to a client request;
   calculating, using the first server, an actual QoS level based on execution of the client-requested service in the first server;
   implementing a QoS requirement service in the first server to monitor execution of the client-requested service, the QoS requirement service comparing the actual QoS level with a requirement specified in the QoS requirements document and requesting the first server to search for an additional resource within the first server when the first server cannot guarantee the requirement specified in the QoS requirements document;
   migrating execution of the client-requested service from the first server to a service in a second server if the first server cannot locate the additional resource or cannot guarantee the requirement specified in the QoS requirements document by using the additional resource, the migration being performed by creating a first connection between the first server and the second server and sending the client request from the first server to the second server over the first connection;
   executing the client-requested service in the second server by using the service in the second server, while maintaining a connection between the client and the first server; and
   monitoring execution of the client-requested service in the second server by using the QoS requirement service of the first server, wherein the QoS requirement service migrates execution of the client-requested service from the second server to a third server when the second server cannot guarantee the requirement specified in the QoS requirements document, the migration being performed by breaking the first connection and creating a second connection between the first server and the third server to send the client request to the third server over the second connection.

* * * * *